Patented Apr. 11, 1944

2,346,569

UNITED STATES PATENT OFFICE 2,346,569

REACTION OF SATURATED HYDROCARBON CARBOXYLIC ACIDS WITH ADMIXED SULPHUR DIOXIDE AND CHLORINE

Arthur L. Fox, Woodstown, N. J., assignor to E. I. du Pont de Nemours & Company, Wilmington, Del., a corporation of Delaware No Drawing. Application November 12, 1940, Serial No. 365,377

2 Claims. (Cl. 204—158)

This invention relates to the reaction of saturated carboxylic acids of the aliphatic or alicyclic series with admixed sulphur dioxide and chlorine and the reaction products. More particularly it relates to the reaction of acids of less than 12 carbon atoms with admixed sulphur dioxide and chlorine. Still more particularly it relates to a process of reacting saturated aliphatic or alicyclic carboxylic acids of 3 to 11 carbon atoms with admixed sulphur dioxide and chlorine in the presence of actinic light and to the organic reaction products thereof.

This invention has for an object the preparation of new carboxylic acid compounds having an additional functional group. A further object is to provide a new use for sulphur dioxide and chlorine. Another object is to obtain sulphonyl chloride derivatives of saturated carboxylic acids. Still other objects are to provide new and novel compounds in an economical manner and in good yields and to provide a general advance in the art.

The above objects are accomplished by the following invention which in its broader aspects comprises reacting a saturated aliphatic or alicyclic carboxylic acid having 3 to 11 carbon atoms inclusive with admixed sulphur dioxide and chlorine under conditions capable of introducing sulphonyl chloride groups into the hydrocarbon radicals.

In a more limited sense, the invention involves reacting a saturated aliphatic or alicyclic monocarboxylic acid with admixed sulphur dioxide and chlorine while irradiating the reaction with actinic light. The reaction will take place over a wide range of temperature and pressure conditions, but in general a temperature below that at which excessive decomposition of products takes place should be avoided.

In one important aspect of the invention, normal alkane carboxylic acids of 3 to 11 carbon atoms are reacted with admixed sulphur dioxide and chlorine while irradiating the reaction zone with light from 1800 A. to 7000 A., and preferably from 3000 A. to 5000 A., and sulphonyl chloride and/or other derivatives are recovered. They can be recovered as such or converted into true sulphonic acids and/or salts or reacted with other compounds to form other chemical products such as esters, amides, etc. The entire reaction products have utility and have many uses without further treatment.

It has been found that when normal alkane monocarboxylic acids of 3 to 11 carbon atoms are so reacted that products of utility are formed. The exact mechanism of the reaction is not fully understood, but it is believed that a sulphonyl chloride group is first introduced, but the reaction may take place in any of several manners. For instance, there may be a metathetical reaction between the sulphonyl chloride group and the carboxyl group so that a carboxylic acid chloride and a free sulphonic acid will result.

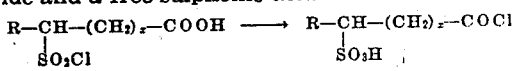

It is also possible that either open chain or closed chain anhydride formation may occur

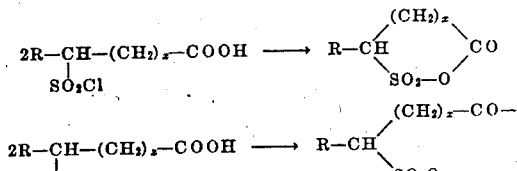

and it is possible that any and all of the above reactions take place. In the above equations $x$ is 0 or a positive integer of 1 to 8 and Y is an integer greater than 1 and R an alkyl radical of such a carbon content so that the total of $x$ and the number of carbon atoms in R equals 1 to 9. The products which are formed by primary and/or secondary reactions are comprehended by this invention. During the treatment of the acid with sulphur dioxide and chlorine some of the hydrogens may be substituted by chlorine atoms. The presence of this chlorine does not interfere with the utility of the product and in many instances has a beneficial effect.

In the case of the alicyclic hydrocarbon carboxylic acids the reaction is carried out in a similar manner. The mono carboxylic acids containing a six-membered ring constitute a preferred embodiment of this aspect of the invention.

The invention shall now be further illustrated but is not to be limited by the following examples:

*Example I*

Three hundred and sixty-four parts of β-decahydronaphthoic acid (2 mols) was melted (M. P. 79–81), and a mixture of about equal parts of sulphur dioxide and chlorine was passed in for 6½ hours at 90–95° in the presence of ultraviolet light, from a mercury vapor lamp. The gain in weight was 200 parts, 7 of which were lost on aerating with nitrogen. The crude reaction mass gave a good analysis of sulphur and chlorine.

One hundred parts of the above reaction mass was hydrolyzed with 10N sodium hydroxide keeping the temperature below 50–60°. This hydrolyzate possessed wetting and surface active properties and had utility as a mercerizing assistant.

Example II

Twenty-five parts of hexa-hydro-benzoic acid was treated with a gaseous mixture of sulphur dioxide and chlorine for 4 hours at a temperature of 40-45° under the influence of actinic light (tungsten filament 100 watt). The gain in weight was 15 parts and there was used 258 parts of chlorine and 835 parts of sulphur dioxide. The product contained 10.2% sulphur and 14% chlorine.

Ten parts of the above product was hydrolyzed with sufficient 10N sodium hydroxide to produce permanent alkalinity to Brilliant Yellow test paper but the product was not soluble at the concentration thus obtained and had to be diluted to obtain complete solubility. This material possessed mercerizing assistant properties, although it was not very soluble in the mercerizing liquids.

Example III

One hundred and seventy-six parts of n-butyric acid (2 mols) were treated with sulphur dioxide and chlorine for 8 hours in the presence of actinic light (tungsten filament 100 watt). The temperature did not rise above 50° and the reaction mass darkened considerably. The gain in weight was 150 parts. The product was warmed on a steam bath under vacuum giving a loss in weight of 8 parts. The residue contained 15.06% sulphur and 18.08% chlorine.

In place of the specific alicyclic carboxylic acids set forth in the above examples can be substituted ortho-, meta-, and para-hexahydrotoluic acids, α-decahydronaphthoic acid and naphthenic acids of less than 12 carbon atoms. Mixtures of one or more of the alicyclic acids hereof can be used. Similarly in place of the specific aliphatic acids can be substituted n-pentanoic, n-hexanoic, n-heptanoic, n-octanoic acid, etc. Acids of 6 to 11 carbon atoms inclusive constitute an important aspect of this invention.

The proportion of reactants may be varied over a wide range. A practical range is from 0.75 to 20 mols of sulphur dioxide and chlorine per mol of acid. A preferred range is 1.1 to 1.5 of $SO_2$ and $Cl_2$ to 1 mol of acid.

The temperature and pressure conditions as previously indicated are not limited to those specifically given in the examples, but may vary widely depending on the particular starting material, nature of the light source, catalyst and pressure selected. Temperatures just above the freezing or solidification points of the reactants up to that at which substantial decomposition of reactants or end products occur can be used. A practical range is from −40° C. to 100° C. and a preferred range from 0° to 80° C. The pressures may vary from ½ atmospheres to 10 or more atmospheres.

Organic solvents which are resistant to the reaction of chlorine and bromine and hydrochloric acid are in general suitable for the process. Chlorinated hydrocarbons such as carbon tetrachloride, tetrachloroethane, ethylene dichloride, trichloroethane, pentachloroethane, hexachloroethane, dichlorfluoroethane, are used. Benzene, toluene, benzine, etc., however, can be used alone or in admixture.

Various sources and wave lengths of light can be used to irradiate the reaction zone and reactants, e. g. direct sunlight, diffused daylight, ultraviolet light, including incandescent lamps, clear, frosted or colored glass lamps, rare gas lamps, fluorescent lamps, mercury vapor lamps, carbon arcs, including metal cored and metal salt cored carbon arcs, etc. Light screens may be used which let certain wave lengths only irradiate the reaction zone. A quartz window or reaction vessel is quite practical. A practical range of wave lengths varies from about 1800 to 7000 Å.

The reaction products can be hydrolyzed and/or neutralized with neutral acid or alkaline solutions, if desired. It is advantageously carried out with alkaline solutions. Thus, dilute caustic 1% to solid stick caustic is effective and solutions 5 to 50% of alkali metal hydroxides strength quite practical. The reaction is somewhat slower with the more dilute caustic soda solutions and almost instantaneous with the more concentrated solution. Other alkali metal hydroxides such as potassium, caesium, etc. may be used. Likewise, the alkaline earth hydroxides and oxides may be employed. An aqueous solution of ammonium hydroxide may be used to yield the ammonium salt. Substituted ammonium salts or amine salts may be obtained by hydrolyzing the product with aqueous solutions of aliphatic, cycloaliphatic, aromatic and heterocyclic amines, such as dimethylamine, ethylamine, diethylamine and triethanolamine, piperidine, diethyl-cyclohexylamine, pyridine, aniline, toluidine, xylidines, b-naphthylamine, etc. Thus, the amine salts of the sulphonic acids may be obtained. Also, the strong quaternary ammonium bases such as tetra-methyl-ammonium-hydroxide and tetra-ethyl-ammonium-hydroxide may be used for the hydrolysis. The resulting products would be the tetra-methyl-ammonium salt or the tetra-ethyl-ammonium salt of the hydrocarbon carboxy sulphonic acid. The preferred salt for use in most treating mercerizing liquors is, of course, the sodium salt. For use in acid or salt solutions, one of the amine or quaternary ammonium salts may be more desirable as possessing greater solubility.

Water-miscible organic solvents may be used during the hydrolysis or neutralization step to promote contact between the reaction mass and the hydrolyzing agents. As examples of such solvents or diluents may be mentioned ethyl, propyl, methyl, etc. alcohols, dioxane, glycol and its ethers and esters, e. g. ethylene glycol diethyl ether, dimethyl ether, etc.

The products of this invention have considerable utility as treating agents and for use in organic syntheses. They may be reacted with amines and long chain alcohols to give soluble amides and esters. They may be used to temporarily solubilize vat color leucos. The longer chain carboxy sulphonic acids are not as sensitive to hard water as are the carboxy acids themselves.

As many apparently widely different embodiments of this invention may be made without departing from the spirit and scope thereof, it is to be understood that this invention is not to be limited to the specific embodiments herein except as defined by the appended claims.

What is claimed is:

1. Process of preparing organic compounds containing carbonyl radicals and sulphonyl radicals which comprises reacting an alicyclic hydrocarbon monocarboxylic acid of 3-11 carbon atoms in the liquid phase with admixed sulphur dioxide and chlorine at a temperature from −40° C. to 100° C. while irradiating the reaction zone with actinic light of wave lengths from 1800 to 7000 Å. and maintaining sufficient sulphur dioxide and chlorine present to introduce sulphonyl chloride groups into the alicyclic hydrocarbon radical of said acid.

2. Process of preparing organic compounds containing carbonyl radicals and sulphonyl radicals which comprises reacting hexahydrobenzoic acid in the liquid phase with admixed sulphur dioxide and chlorine at a temperature from −40° C. to 100° C. while irradiating the reaction zone with actinic light of wave lengths from 1800 to 7000 Å. and maintaining sufficient sulphur dioxide and chlorine present to introduce sulphonyl chloride groups into the alicyclic hydrocarbon radical of said acid.

ARTHUR L. FOX.